Nov. 30, 1943.   H. F. LANG   2,335,343
ACCOUNTING MACHINE
Filed Dec. 30, 1938   7 Sheets-Sheet 1

Henry F. Lang
Inventor
By Karl Beust
His Attorney

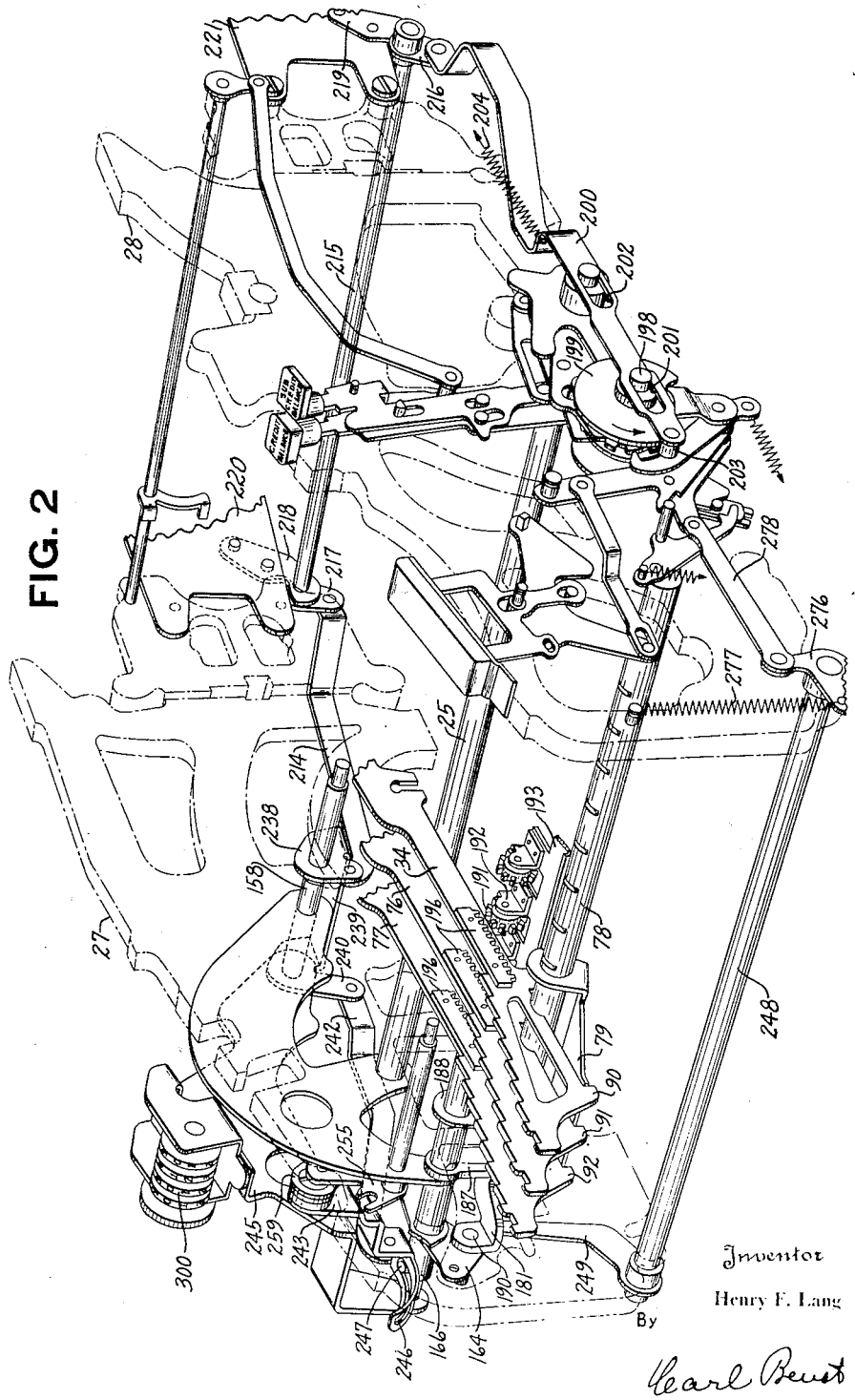

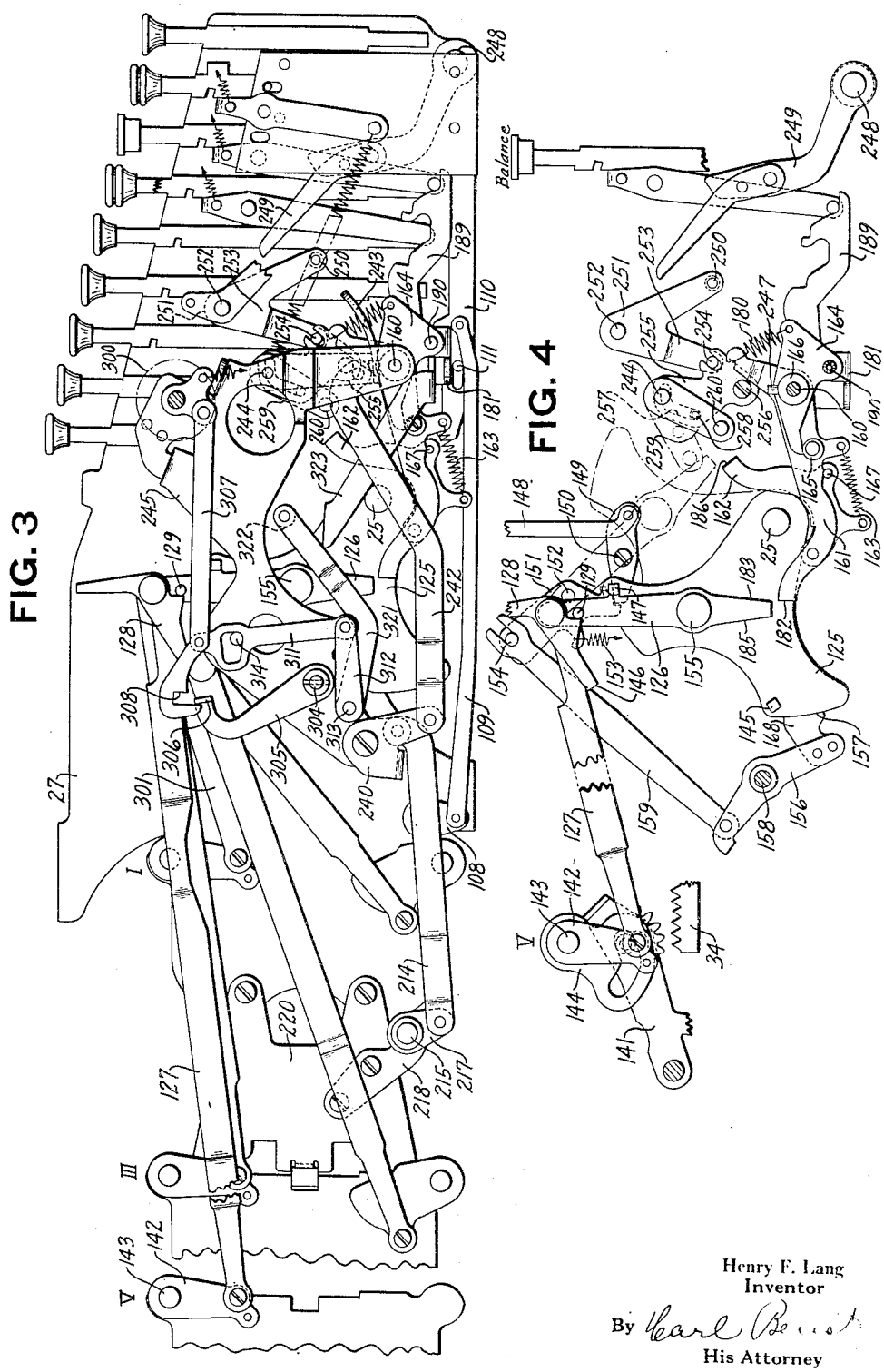

Nov. 30, 1943.   H. F. LANG   2,335,343
ACCOUNTING MACHINE
Filed Dec. 30, 1938   7 Sheets-Sheet 4
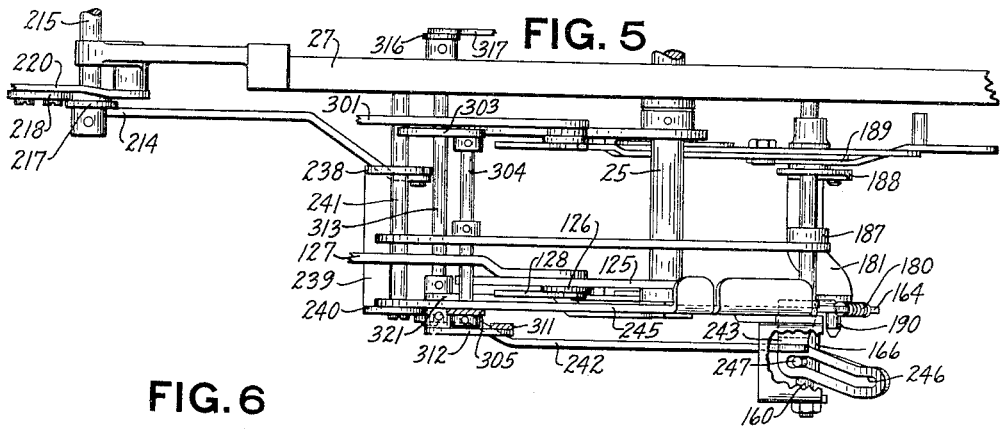
FIG. 5
FIG. 6
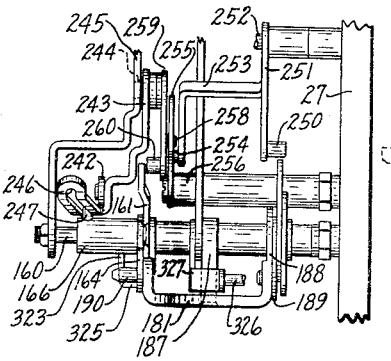
FIG. 7
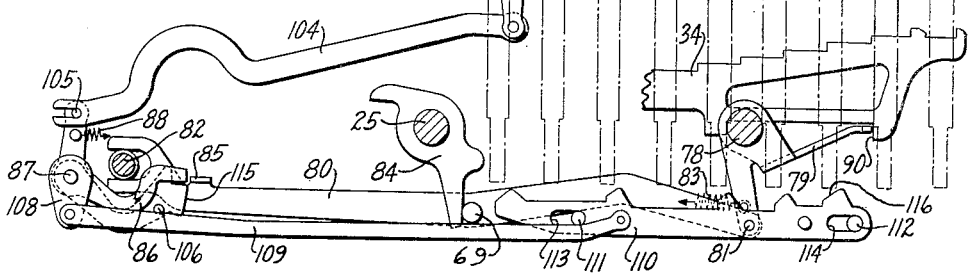
FIG. 8
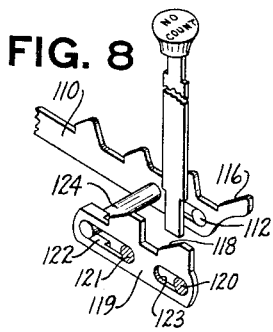
FIG. 9
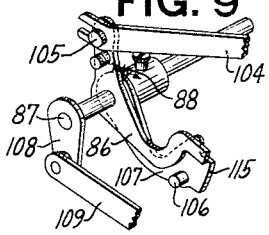
Henry F. Lang
Inventor
By *Karl Beust*
His Attorney Nov. 30, 1943.  H. F. LANG  2,335,343
ACCOUNTING MACHINE
Filed Dec. 30, 1938  7 Sheets-Sheet 5
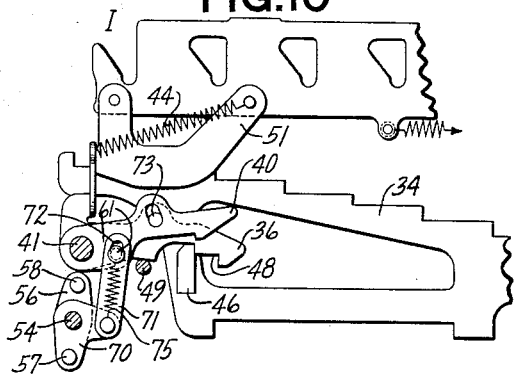
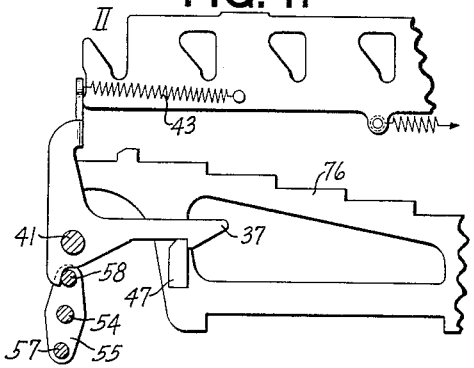
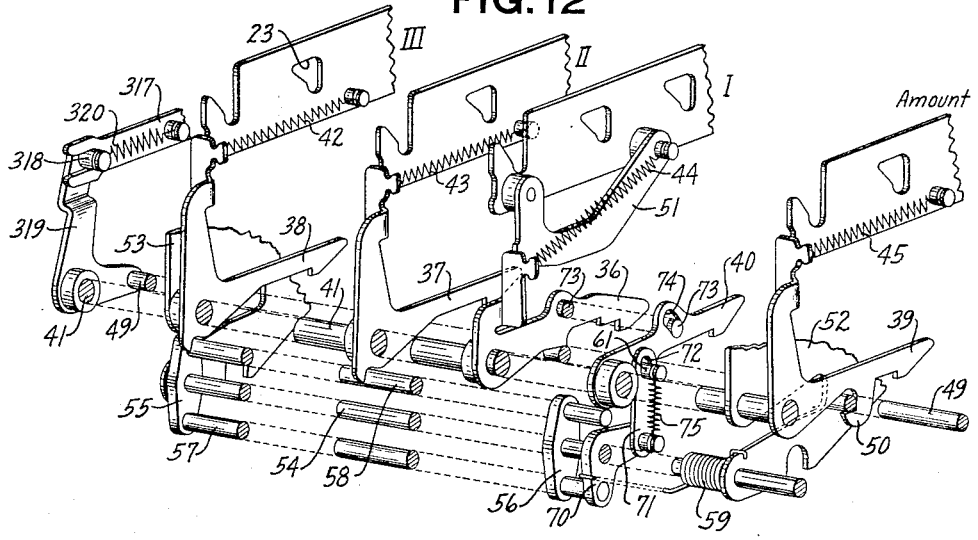
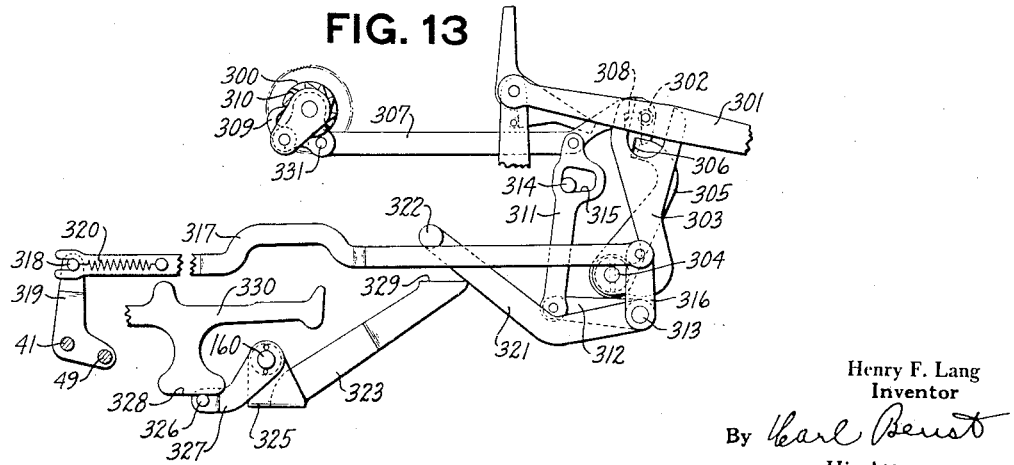
Henry F. Lang
Inventor
By Carl Berust
His Attorney Nov. 30, 1943.   H. F. LANG   2,335,343
ACCOUNTING MACHINE
Filed Dec. 30, 1938   7 Sheets-Sheet 6
FIG. 14
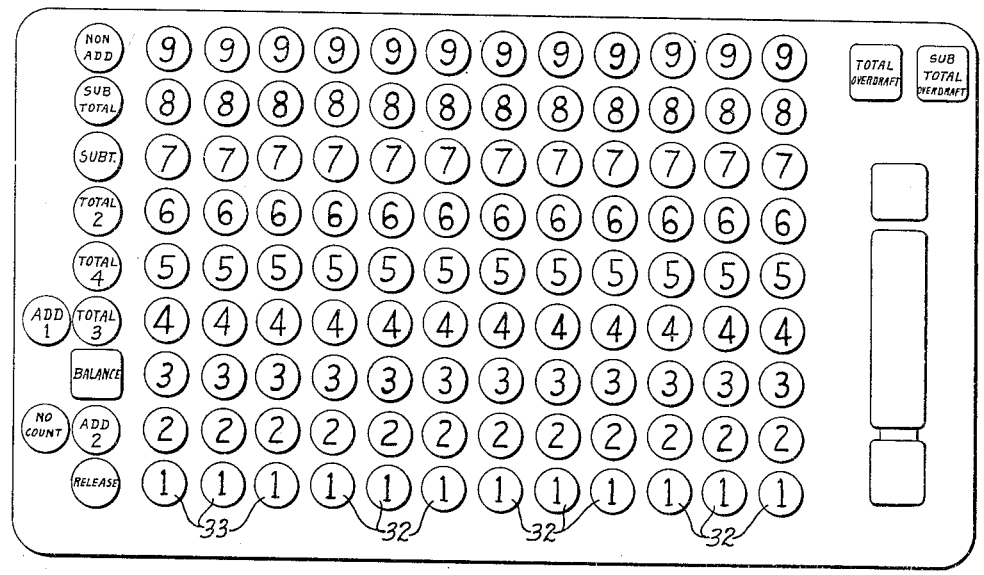
FIG. 15
| JOHN DOE IN ACCOUNT WITH | | | | | JOHN DOE | |
|---|---|---|---|---|---|---|
| CHECKS | | DEPOSIT | ITEMS | BALANCE | ITEMS | BALANCE |
| 25.00 | 10.00 | 75.00 | 2 | 40.00 | 2 | 40.00 |
| 160.00 | | | 15 | 120.00 CR | 15 | 120.00 CR |
| 40.00 | | 500.00 | 1 | 340.00 | 1 | 340.00 |
| .60 | | | 1 | 339.40 | 1 | 339.40 |
FIG. 16
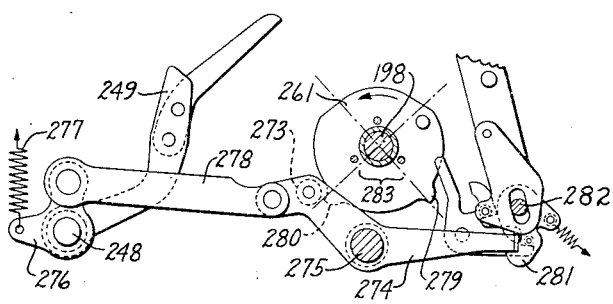
Inventor
Henry F. Lang
By
Earl Benst
His Attorney Inventor
Henry F. Lang
By [signature]
His Attorney Patented Nov. 30, 1943

2,335,343

UNITED STATES PATENT OFFICE 2,335,343

ACCOUNTING MACHINE

Henry F. Lang, Dayton, Ohio, assignor to The National Cash Register Company, Dayton, Ohio, a corporation of Maryland Application December 30, 1938, Serial No. 248,403

9 Claims. (Cl. 235—60)

This invention relates to bookkeeping or accounting machines and the like, and is more particularly concerned with totalizer control mechanism associated with means for recording positive and negative data.

In bookkeeeping or accounting machines having an add and subtract totalizer consisting of a single pinion for each denominational order, the said totalizer is often passed through the zero position by having more subtracted therefrom than is added thereto, leaving on the totalizer the complement of the true negative total. Mechanism has heretofore been devised for converting such complement of the true negative total so as to be available as the true negative total for printing. Such operations require multiple machine cycles, at the end of which the add and subtract totalizer may either be left in a cleared condition or may contain the complement of the true negative total standing thereon at the commencement of the multiple-cycle operation, the former operation being termed a total taking of the overdraft and the latter operation termed a sub-total taking of the overdraft.

In keeping debtor-creditor accounts with a machine having an add and subtract totalizer, it is often desirable to have a total of the number of items, such as checks, bills, invoices, etc., involved in the transactions, which total is entered on a separate totalizer. Mechanisms have heretofore been devised to print along with totals of the add and subtract totalizer, be they positive or negative, the positive total of the items involved in the transactions, but such mechanisms have not been capable, when there is an overdraft condition in the add and subtract totalizer, of restoring the data to both the totalizers as is required for a sub-total taking operation.

Therefore it is the principal object of this invention to provide means to take, in the same machine operation, the sub-total of an overdraft of an add and subtract totalizer and a sub-total of an adding totalizer.

Another object of the invention is to provide means whereby, in a sub-total operation involving the printing of the true negative total of an overdrawn add and subtract totalizer, there may be printed therewith the sub-total of a separate adding totalizer.

Another object of the invention is to provide means whereby an accounting machine may print in one operation both the true negative balance of an overdrawn add and subtract totalizer and a positive total of another totalizer after which the data is restored on said totalizers.

Applicant's invention is shown embodied in the well known type of accounting machine illustrated and described in United States Letters Patent, No. 1,197,276, and No. 1,203,863, issued to Halcolm Ellis, and No. 1,819,084, issued to Emil John Ens, and more especially in the machine described in the United States Patent No. 2,243,806, issued to Laurence N. Lehman on May 27, 1941, which machine is also described in French Letters Patent, No. 821,762, issued to The National Cash Register Company, August 30, 1937. Although applicant has shown the invention embodied in the above type of machine, it may in principle be adapted for use in other types of machines. Applicant will describe the invention as embodied in a machine adapted for bank customer accounts but again the principle of the invention is not limited to the system of bookkeeping used as an example, as the machine is flexible and adapted in principle to serve for a variety of accounting systems.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

In the drawings:

Fig. 2 is a perspective view of a portion of the item totalizer engaging controls for sub-total overdraft operations, with the frame of the machine shown in dot-and-dash lines in relation thereto.

Fig. 3 is a fragmentary vertical section through the machine from front to rear to the left of the totalizer selecting and engaging mechanism looking toward the right.

Fig. 4 is a detail of part of the item totalizer selecting and engaging mechanism.

Fig. 5 is a plan view of a portion of the totalizer selecting and engaging mechanism shown in Figs. 3 and 4.

Fig. 6 is a front elevation of the totalizer selecting and engaging mechanism shown in Figs. 3, 4, and 5.

Fig. 7 is a detail of the mechanism for blocking the movement of the differential racks associated with the item key banks on certain machine operations.

Fig. 8 shows the key controlled mechanism for blocking the item differential racks.

Fig. 9 is a perspective view of part of the mechanism shown in Fig. 7.

Fig. 10 is a detail showing the forward end of the differential rack for the first item key bank and the automatic item entering mechanism associated therewith.

Fig. 11 is a detail showing the forward end of the differential of one of the other item banks and zero stop pawl mechanism therefor.

Fig. 12 is a perspective of the three item key bank zero stop pawls and detents and the highest order amount key bank zero stop pawl and detent and the associated mechanisms.

Fig. 13 is a detail of the mechanism for actuating and controlling the counter for counting the number of machine operations.

Fig. 14 is a representation of the keyboard arrangement.

Fig. 15 is a facsimile of part of a typical work sheet produced by the machine.

Fig. 16 shows the cam mechanism controlling the engagement of the item totalizer on certain cycles of an overdraft operation.

General description

Figure 1:
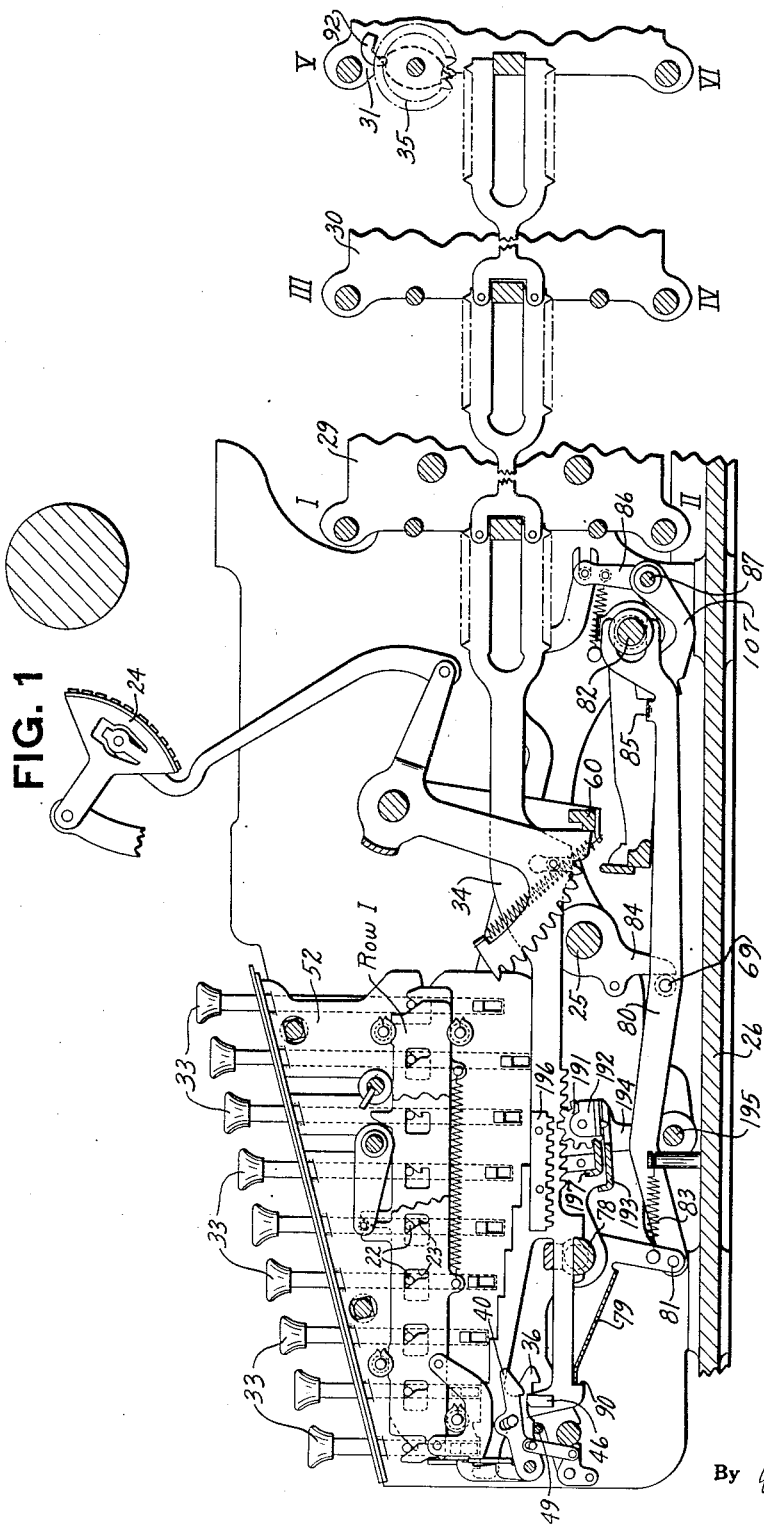
Fig. 1 is a fragmentary vertical section through the machine from front to rear to the right of the first item key bank looking towards the left.

The machine embodying the instant invention comprises in general a frame, a main operating mechanism, a keyboard having control keys and data keys, a paper carriage having a spacing mechanism and control devices, a differential mechanism, a balance totalizer, data totalizers, totalizer engaging mechanism, and a printing mechanism, the essential portions of these which are necessary to a description of this invention being shown in the drawings.

More detailed descriptions of parts of the machine not necessary to an understanding of the invention are contained in the patents to which reference has been made and to which further reference shall be made from time to time.

Frame

The frame of the machine consists in part of a base frame plate 26 (Fig. 1), side frame plates 27 and 28 (Figs. 2, 3, 5, and 6), and totalizer supporting frames 29, 30, and 31, fragmentary portions of the left ones being shown in Fig. 1, which are fastened together and strengthened by cross pieces and shafts. The various shafts to be described are journaled in the frame plates or appended parts.

Main operating mechanism

The main drive shaft 25 (Figs. 1, 2, 3, 4, 5, and 7) is given one complete oscillation for single cycle operations such as adding, subtracting or total taking, and is given four complete oscillations for four cycle operations such as taking a total or sub-total of an overdraft of the adding and subtracting totalizer or, as hereinafter termed, the Balance totalizer. Reference to the Lehman patent heretofore mentioned, will give a full description of the mechanism for operating the main drive shaft in the various operations.

In a single oscillation the main drive shaft 25 (Fig. 1) is rocked first in a counter-clockwise manner and then in a clockwise manner to home position.

Differential racks and keyboards

Data is entered into and withdrawn from the denominational elements of the totalizers, in the well known manner, by means of differential toothed racks 20 (Fig. 17) which are operable to position the totalizer elements 21, by forward and backward motion induced by the main operating mechanism, as selectively and differentially controlled by the keys.

Figure 17:
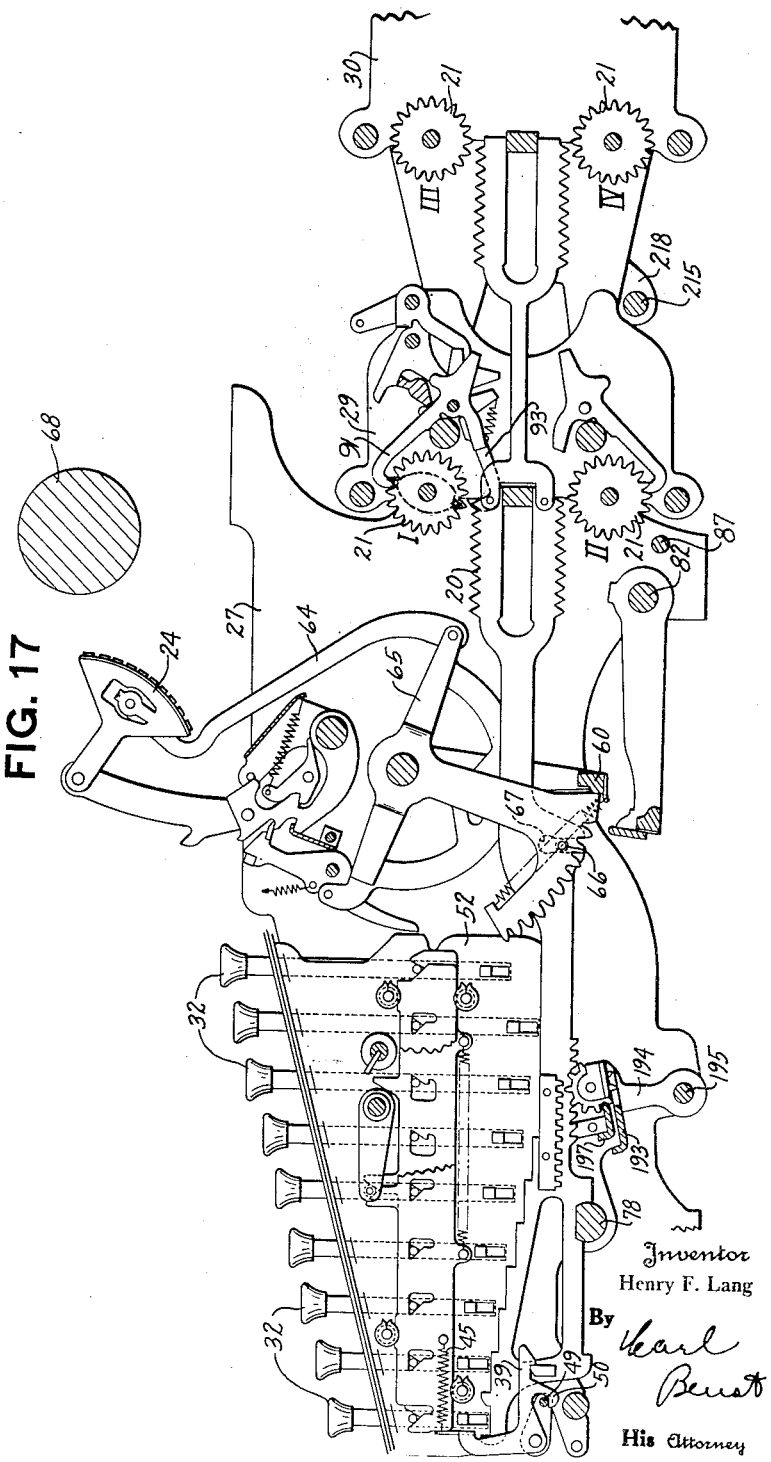
Fig. 17 is a fragmentary vertical section through the machine from front to rear, to the right of an amount bank looking towards the left.

The keyboard (Fig. 14) consists in part of a plurality of rows of amount keys 32, each row comprising a denominational order, and a plurality of rows of item keys 33, each row also comprising a denominational order. These keys are slidably mounted in the usual manner so that, upon depression, the keys of a given order cooperate with the associated differential rack. A typical amount bank and associated differential rack 20 and the corresponding totalizer elements 21 are shown in Fig. 17. The units order bank of the item keys 33 and the associated differential rack 34 are shown in Fig. 1. The racks on being spring urged rearwardly, when released by the leading frame 60 moving in response to the operating mechanism, are positioned commensurate with the value of the keys depressed.

Totalizers

The rear ends of the racks 20 (Fig. 17) representing the keys 32 are provided with teeth that will cooperate in the usual manner with the toothed pinions 21 of totalizers upon engagement therewith. Each rack in those denominational orders represented by the keys 32, is alined with a corresponding totalizer pinion in each of the totalizer rows I, II, III, IV, and VI, there being no totalizer pinions of those denominations on totalizer row V. However the totalizer row V has three pinions thereon, representing the three denominational order rows 33, which are actuated by racks 34 (Fig. 1) similar to the amount differential racks. Totalizer pinion 35 (Fig. 1) is associated with the right key bank row of the three key bank rows 33, as Fig. 1 is a section immediately to the right of said row. As is shown in Fig. 1 there are no totalizer pinions on the totalizer rows I, II, III, and IV for this key bank, the same being true for the other two item key banks represented by the keys 33. The totalizer pinions are normally disengaged from the toothed racks. Totalizer I is an adding and subtracting totalizer of the single pinion type described in the Lehman patent, which, when overdrawn, carries the negative data in complementary form. The engagement of the totalizers of rows II, III, IV, and VI with the racks, for entering and withdrawing data, is under control of keys and of control elements on the movable paper carriage like that shown in the patents to which reference has been made, and no description of such controls will be made herein, such disclosure being unnecessary to an understanding of the invention. The means for engaging totalizer rows I and V with the racks will be fully explained hereinafter.

Printing mechanism

Each differential rack 20 and 34 (Figs. 1 and 17) has associated therewith a printing segment 24 settable commensurate with the position of its associated rack by means of a link 64, a reducer arm 65, a stud 66, and a slot 67. On the rear edge of the printing segments are symbols positioned to make an impression, corresponding to the data represented by the position of the rack, on record material carried by a platen 68. A symbol-printing segment, shown in the Lehman patent, is positioned by shaft 87, the operation of which shaft is herein described. All of this printing mechanism is old in the art and contained in detail in the cited references.

*Means for automatically entering data into the item totalizer*

The differential rack 4 (Fig. 1), representing the units order bank of item keys 33, is normally conditioned to move automatically one unit, as represented by the "one" key of that row, on each operation of the machine if an amount key 32 is depressed. Special controls are provided to prevent such automatic movement of the rack 34, when the carriage is in certain columnar positions, when an item key 33 has been depressed, and in key controlled "no count" operations. When it is desired to enter into the item totalizer a number larger than "one" the keys 33 are depressed in the usual manner which supersedes the automatic movement of the unit rack.

Associated with each amount key bank and with each item key bank is a sliding plate each being adapted, through cooperation with studs 22 on the stems of the keys in their respective rows and with cam slots 23 in the plates, to be moved toward the front of the machine when any key in the associated row is depressed. In Fig. 12 the plates associated with the first, second, and third item key banks are indicated by I, II, and III respectively, and the plate representing the highest order key bank in the amount rows is indicated by the word "amount." The sliding plates associated with the lower order amount banks are not illustrated, as they are duplicates of the one shown. Each sliding plate upon forward movement caused by depressing a key in the associated row acts to release the zero stop pawl of that row. The zero stop pawls 36, 37, and 38 representing item key banks I, II, and III, and zero stop pawl 39 representing the highest order amount key bank are loosely mounted on shaft 41. These pawls have upwardly extending arms held in resilient contact with the forward ends of their associated sliding plates by spring 42, 43, 44, and 45. Rearwardly extending arms of said zero stop pawls are provided with retaining hooks to latch over lugs projecting from their associated differential racks, the lugs 46 and 47 (Figs. 10 and 11) being typical. Depression of a key will raise the associated zero stop pawl allowing the rack to follow the leading frame 60 (Fig. 17) unless otherwise controlled. The zero stop pawl 37 (Figs. 11 and 12) is typical of those for the tens and hundreds item key banks. The pawl 36 associated with the I item key bank (Figs. 10 and 12) is specially designed with two latching shoulders one of which holds the rack in home position and the other 48 allowing a movement of the rack rearwardly one step, being conditioned to do so by depressing any amount key 32 (Fig. 14). The rack for item key bank I is released entirely upon depressing any key in the I item key bank. A second pawl 40 (Figs. 10 and 12) cooperates with the lug 46 to assure that the automatic entry of one unit will not be made in the event a number ending in a cipher is entered by the operator by means of the item keys 33, in which event said pawl 40 becomes effective and the differential rack of item row I is kept from moving.

Referring to Fig. 10, the shoulder portion 48 on pawl 36 into which the lug 46 is allowed to move whenever the pawl is raised slightly by means of a rod 49 (Figs. 10 and 12) causes the rack to move, in following the leading frame, a distance that will add one unit into V totalizer if said totalizer is in engagement therewith. Rod 49 is lifted by means of hooks 50 (Fig. 12) on the zero stop pawls of the amount banks, zero stop pawl 39 being typical. Whenever one of the amount bank zero stop pawls is rocked by depression of an amount key the rod 49 and pawl 36 are thereby raised enough to allow the rack 34 to move the distance of one unit, if not otherwise prevented, which movement enters the automatic "one" into the V totalizer if that totalizer be engaged in add timing. Rod 49 is supported by arms loosely mounted on shaft 41 and pawl 36 is the only pawl normally resting thereon. The leftmost of the supports for rod 49 is a bell crank lever 319 (Fig. 12) to which reference will be later made. Inasmuch as pawl 36 (Figs. 10 and 12) must be raised a second step to entirely free rack 34 it is arranged that movement forwardly of the slide for item row I, upon depressing a key in that bank, will rock zero stop pawl 36 slightly more than the pawls in rows II and III are rocked when a key is depressed therein, this result being accomplished by fastening to sliding plate I an extension piece 51 (Figs. 10 and 12) positioned lower to engage the upper extending arm of pawl 36, which has been correspondingly shortened, thus causing the forward motion of slide I to be applied to the pawl 36 nearer its axis of rotation, shaft 41, thus rocking pawl 36 a greater angular distance than pawls 37 and 38 are rocked when keys in rows II and III are depressed, so as to entirely free rack 34 (Fig. 10).

The second stop pawl 40 (Figs. 10 and 12) mounted on shaft 41 and associated with rack 34, of the I item key bank, is normally held in ineffective position but is adapted to be rendered effective to lock said rack 34 in the event an item key in item row II or III is depressed and none in row I is depressed. In the key bank frame 52 (Figs. 1 and 12) of the highest amount bank and key bank frame 53 (Fig. 12) of the highest item key bank is journaled a shaft 54 (Figs. 10, 11, and 12) having rockably mounted thereon a frame consisting of side plates 55 and 56 joined by rods 57 and 58. The frame is normally resiliently held, by a spring 59 (Fig. 12), so that rod 58 is kept in contact with heels on zero stop pawls 37 and 38 in such a manner that if either pawl is rocked, due to depressing a key in row II or III, the frame is rocked in a clockwise direction as viewed from its right end. Mounted on the shaft 54 and rod 57 is a bell crank lever 70 (Figs. 10 and 12) having a link 71 pivotally mounted on its horizontal rearwardly extending arm. The upper end of link 71 has an elongated slot 72 through which a stud 61, projecting from pawl 40, is inserted, said stud 61 having clearance in slot 72 for free movement when pawl 40 is lifted by the zero stop pawl 36 through a rod 73 extending laterally from pawl 36. If a key is depressed in item rows II or III and none is depressed in row I the bell crank lever 70 will be rocked clockwise sufficient to resiliently position pawl 40, by pull of spring 75, to effective position to lock the rack 34 in home position. However, if in addition to a key in item rows II or III being depressed, a key in item row I is depressed, rod 73, secured in zero stop pawl 36 and inserted in an elongated slot 74 in pawl 40, will be raised with pawl 36, which movement will thereby raise pawl 40 against the action of spring 75, superseding the action of rows II and III to make pawl 40 effective, thus freeing the rack 34 to be controlled by the depressed item key in row I, when not otherwise arrested.

*Carriage controlled latch for item entering racks*

Provision has been made to hold the item entering racks 34, 76, and 77 (Figs. 1, 2, and 7) in home position during certain operations regardless of the movement of the associated zero stop pawls to ineffective position. Mounted loosely on shaft 78 (Figs. 1, 2, and 7) is a latching member 79 having a forwardly extending flange blocking the rearward movement of all of said item entering racks by contacting shoulders 90, 91, and 92 on said racks. Clockwise movement of latching member 79 as seen in Fig. 7 will release all of the said item entering racks 34, 76, and 77 (see Fig. 2) to control by the zero stop pawls. Link 80 (Figs. 1 and 7) pivotally connected by stud 81 to a downwardly extending arm of latching member 79 and mounted at its rear end on shaft 82, by means of a bifurcation, is slidable forwards and backwards to latch and unlatch the item racks. A spring 83 constantly tends to urge the link to the rearward or unlatching position. Cam lever 84 fast to the main drive shaft 25 normally holds link 80 in the latching position by contact with stud 69 projecting from link 80, but releases it during a machine operation to the action of spring 83 as said shaft 25, as before explained, rocks first clockwise and then counter-clockwise as seen in Fig. 7. A bent over ear 85 on link 80 normally contacts the forwardly extending arm of a bell crank lever 86 (Figs. 7 and 9) loosely mounted on shaft 87. As shown in Fig. 7, bell crank lever 86 is resiliently kept at its farthest clockwise position by a spring 88 (Fig. 7) holding stud 105 in engagement with a slot in the rear end of link 104, which link has its forward movement limited by contact of lever 89 with frame 95, in which position bell crank lever 86 normally blocks the rearward unlatching movement of link 80. Lever 89 (Fig. 7), rockable by carriage borne control elements, the construction and operation of which control elements are well known in the art and described in the cited references, has fastened to the left end thereof a link 100 which is drawn upwardly when the lever 89 is rocked out of home position determined by frame member 95 by one of said control elements, which in turn rocks a bell crank lever 102, mounted on a stud 103, in a clockwise manner. A typical control element 101 is shown in Fig. 7 in ineffective position. The lower extending arm of bell crank lever 102 is pivoted to the forward end of a link 104 the rear end of which is bifurcated to engage a stud 105 on the upper extending arm of bell crank lever 86, so that rearward movement of link 104, upon lever 89 being rocked by a control element, causes the bell crank lever 86 to be rocked counter-clockwise, clearing the path of movement of the ear 85. Bell crank lever 86 also may be rocked counter-clockwise to ineffective position by means of a stud 106 (Figs. 7 and 9). Stud 106 projects from an arm 107 secured to shaft 87 which is rocked clockwise by means of arm 108, also secured to said shaft 87, when link 109 is moved forwardly. Link 109 is pivotally fastened at its rear end to arm 108 and at its forward end to a plate 110 which is slidably mounted on studs 111 and 112 within limits imposed by slots 113 and 114 (Fig. 7). Plate 110 is resiliently held in its rearmost position by means of shaft 87 which is held in its most clockwise position by the weight of a symbol carrier not shown in the drawings, but which is shown in the Lehman patent, to which reference has been made, in connection with the symbol printing mechanism.

If plate 110 is moved forward intermediate between its foremost and rearmost positions, surface 115 (Figs. 7 and 9) will be moved in front of ear 85. If plate 110 is moved to its foremost position, surface 115 is raised clear of ear 85 and in so being raised, stud 106 raises the forward arm of bell crank lever 86 allowing link 80 to move to the rear when the machine is operated, thus freeing the item racks of the control of latch member 79. On the upper edge of plate 110 are camming lugs cooperating with the key stems in the control key bank. The camming surface 116 (Fig. 7) cooperates with the total or balance key for I totalizer (see Fig. 14), so as to move plate 110 to its foremost position thus freeing the item racks for movement on such operation. In sub-total operations of the I or balance totalizer the balance key is depressed in conjunction with the sub-total key, causing the same result. The other camming surfaces on plate 110 are provided to move plate 110 to a determined position when any of the keys associated therewith are depressed depending on whether the item racks are to be released or blocked. The movement of plate 110, link 109 and shaft 87 also serves to set the symbol printing segment for various machine operations as controlled by the keys depressed. The symbol printing mechanism not being essential to this disclosure is not shown herein, but is shown in the cited references.

A special "no count" key shown in Figs. 8 and 14 is provided to block the item racks by special manual control. Depression of this key, through camming surface 118 on a slide 119 mounted on frame supported studs 120 and 121, causes the slide 119 to be moved to its forward limit of motion as determined by slots 122 and 123 carrying with it the plate 110 by means of a pin 124 mounted on plate 110 and inserted through slot 122 so as to normally bear against the rear end thereof as shown. Full movement forwardly of slide 119 is just sufficient to move plate 110 to its intermediate position causing surface 115 (Fig. 7) to block the rearward movement of link 80 thus keeping the differential racks of the item rows latched in home position preventing entry of items into totalizer V.

If it is desired to overcome the action of the carriage control elements permitting automatic item entering on certain machine operations without having to depress the "no count" key, the key controlling such operation may be used to shift plate 110 to one of the intermediate positions raising surface 115 to effective position. Such a key 124 is shown in Fig. 7.

*Item totalizer engaging means*

The item totalizer V (Figs. 1 and 4) comprises three pinion wheels each of which represents and is actuated by the associated differential rack of the item denominational rows I, II, and III. These pinions may be rotated by the racks under key control in adding operations and may be caused to differentially position the racks by being stopped at zero when reversely rotated in total taking and sub-total taking operations, the time of engagement with the racks during the operative cycle determining the type of operation as is well known in the art.

In this type of machine, adding operations consist in setting the racks differentially during the first half of the operative cycle then engaging the totalizer pinions with them as they are returned to home position.

On the main drive shaft 25 (Figs. 3 and 4) is a plate 125 which is rocked first clockwise then counter-clockwise by said shaft on each machine operation. Pivoted to said plate is a flying lever 126 having pivoted to its upper end a link 127 and a bell crank lever 128, said bell crank lever 128 being normally resiliently held in its extreme counter-clockwise position, as determined by stud 129, by a spring not shown.

The rear end of link 127 is fastened to the arm 142 of the totalizer engaging shaft 143 so that forward movement of link 127 will rock shaft 143 counter-clockwise causing camming plate 144 (Fig. 4) secured thereto to rock the totalizer supporting frame, the left arm 141 of which is shown, and the totalizer pinions toward their associated racks.

As plate 125 is rocked clockwise on the first half of the operative cycle, square stud 145 normally will meet surface 146 on bell crank lever 128 whereupon relative motion between lever 126 and plate 125 ceases and the remaining clockwise motion of plate 125 draws link 127 forward, engaging the totalizer V at the end of the first half cycle. On the counter-clockwise movement of plate 125 during the last half of the operative cycle, square stud 147 contacts flying lever 126 whereupon link 127 is forced rearwardly disengaging the totalizer near the end of the operative cycle. Thus, the No. V totalizer is normally conditioned to be engaged with the differential racks during the last half of the machine operation in add timing on each operation of the machine.

Instead of the V totalizer being engaged with the differential racks in add timing each machine operation, means has been provided to prevent stud 145 from engaging surface 146 of bell crank lever 128 unless the carriage is in position where there is a control element to rock a lever which rocking movement is transmitted to a link 148 (Fig. 4) drawing it upwardly which, in turn, rocks retaining pawl 149 counter-clockwise around pivotal stud 150. When pawl 149 is rocked counter-clockwise it releases a bell crank lever 151, pivotally mounted on a frame supported stud 152, to the action of a spring 153 tending to turn it counter-clockwise. Bell crank lever 151 has a pin 154 projecting from its upper arm into the plane of movement of bell crank lever 151 so that, as flying lever 126 turns about pivotal stud 155 as a center, the upper arm of bell crank 128 will strike pin 154, if it is in home position as shown in Fig. 4, causing said bell crank lever 128 to turn clockwise in relation to flying lever 126 which will move surface 146 out of the path of movement of stud 145 as plate 125 is rocked clockwise, thus preventing the engagement of the totalizer. However, if pawl 149 releases bell crank lever 151 to the action of spring 153, pin 154 will not be struck by the upper arm of lever 128 and the V totalizer will be engaged in add timing. As the plate 125 rocks counter-clockwise to home position, a lever 156 is rocked counter-clockwise on a frame supported shaft 158 by contact of the surface 157 of plate 125, against extension 168 of lever 156, which moves link 159 upwardly, thereby, through engagement of the bifurcated upper end of said link with pin 154, rocking bell crank lever 151 to home position where it is reengaged by pawl 149, providing the control element on the carriage no longer holds link 148 upwardly. If the control element is still in effective position pawl 149 will not latch. In the particular accounting problem employed as illustrative of the invention it is seen by reference to Fig. 15 that the control element, conditioning the V totalizer engaging mechanism for adding, would be placed so as to be effective in the check printing positions 62. The placement of the control elements is entirely optional, being governed by the particular accounting system. In this particular accounting system it is assumed that only the checks are to be counted.

On total and sub-total operations it is necessary to engage the totalizer pinions with the racks at the beginning of the machine cycle so the rearward movement of the racks will rotate the totalizer pinions to zero by the middle of the cycle. On total taking operations the totalizer pinions are disengaged from the racks before forward movement of the racks to home position, thus leaving the totalizer at zero. On sub-total operations the racks are in engagement with the totalizer pinions on both their rearward and forward movements.

Secured to a hub on a collar 166 (Fig. 4) rotatable on a shaft 160 is a lever 161 having pivotally mounted on its forward end a lever 162. By means of a spring 163 and a stop stud 167, levers 161 and 162 are normally held in the position shown in Fig. 4, but lever 162 may be moved clockwise relative to lever 161, against the tension of spring 163. Integral with collar 166 is a lever 164 resiliently held in the position shown in Fig. 4 by a stop stud 165 and spring 180, to cause a flexible coupling between the levers 161 and 164, so that lever 164 may be moved clockwise relative to lever 161 against the tension of spring 180. Spring 180 is sufficiently strong so that clockwise movement imparted to lever 164 through yoke 181, as will be explained, moves lever 161 and 162 with it, so as to place surface 182 in the path of movement of the surface 183 on flying lever 126, as plate 125 is rocked clockwise thus engaging totalizer V at the commencement of the cycle of operation. The flexible coupling of levers 161 and 164 prevents breaking of the parts in case of misoperation of the machine.

Continued movement of plate 125 causes surface 183 to strike lever 162, which engages the V totalizer, after which surface 183 by-passes lever 162 due to the flexible construction, near the middle of the cycle. At this point lever 161 is allowed by its own weight to return to normal, if a sub-total is to be taken, which allows the totalizer to remain in engagement with the racks until the close of the machine operation when stud 147 contacts flying lever 126 disengaging the totalizer. On total operations, by keeping lever 164 turned clockwise during the return of plate 125 counter-clockwise to home position, surface 185 of flying lever 126 will strike surface 186 of lever 162 taking the V totalizer out of engagement with the differential racks before the racks move to home position in the second half of the operative cycle, thus leaving the totalizer pinions at zero. With the exception of the yoke method of actuating lever 164, which depends on depression of the "balance" key which is the total key for the I totalizer as will be next explained, this total engagement mechanism is old in the art and further details may be secured from the cited references if desired.

It is desirable on total and sub-total printing operations of the balance or I totalizer that the amount standing on the item or V totalizer shall be printed with the balance to indicate the number of items constituting that total, and therefore the connection by means of yoke 181 (Figs. 4, 5, and 6) has been provided between the totalizer total taking controls of the I and the V totalizers so that depressing the balance key will normally operate both the I and V totalizer engaging mechanisms.

The totalizer engaging means for the I or balance totalizer is substantially the same as that for the V totalizer, which has been described, consisting of a plate secured to and oscillating with shaft 25, said plate having a flying lever pivotally attached thereto to operate the link 301 (Fig. 3) at the proper times as determined by the add timing or the total timing controls. The I totalizer total control lever 189 (Figs. 3 and 4) operated by the balance key is arranged to operate the V totalizer total control lever 161 by means of its flexible connection to lever 164.

The yoke 181 is loosely mounted on shaft 160 (Fig. 6) by two arms 187 and 188. Arm 188 is fastened to total control lever 189 (Figs. 3, 4, and 6) of the totalizer engaging mechanism for the balance or I totalizer so that, when the "balance" key (Fig. 4) is depressed, the lever 189 will be rocked, conditioning the balance totalizer controls, which simultaneously will rock the yoke 181 (Figs. 4 and 6) around shaft 160. Lever 164 has therein a hole for receiving a pin 190 projecting from the left end of yoke 181. Collar 166 may be shifted to the left (Fig. 6) on shaft 160 without disconnecting the pin 190 from lever 164 as the pin 190 is longer than the possible shifting movement of collar 166. The movement of yoke 181 in response to the movement of lever 189, therefore always moves lever 164 thus controlling the total and sub-total timing of the I and V totalizers alike, providing levers 161 and 162 are, as is normally the case, in the plane of movement of flying lever 126 as shown in Figs. 5 and 6. In sub-total operations the "balance" key is released near mid cycle which allows the levers 189 and 164 to assume their normal position. Therefore, whenever a total or sub-total of the balance or I totalizer is taken, the item or V totalizer is operated in the same manner unless collar 166 (Fig. 6) is shifted to the left from its normal position, rendering levers 161 and 162 ineffective to control the flying lever 126.

*Overdraft totals and overdraft sub-totals of balance totalizer*

Whenever the "balance" totalizer is overdrawn the negative data thereon will be in complementary form which requires special total taking and sub-total taking mechanism to print it in true form, and as the data on the V totalizer is always in positive form, special mechanism is provided to operate the V totalizer by independent means.

The machine is provided with a data storage device consisting of a ten-toothed storage pinion for each bank of keys, each of the storage pinions 191 (Figs. 1 and 2) being engageable with a toothed member 196 on the associated differential rack. Each of said storage pinions is rotatably mounted on an individual support 192 pinned to a rockable frame 193, common to all of the storage pinions, which frame is mounted loosely by means of arms on shaft 78. Frame 193 bears studs engaged in cam slots in an arm 194 (Fig. 1) on the left end, and a similarly slotted arm, not shown, on the right end, which camming arms are fastened to shaft 195. By rocking the shaft 195 to which the camming arms are secured, in a counter-clockwise manner, the pinions of the storage device will be moved in unison by cams to engage their associated toothed members 196 so as to be differentially rotated thereby in data entering operations or to control the differential movement of the rack in data withdrawing operations, as will be explained. An alining device 197 locks the pinions 191 when they are not engaged with the toothed members 196, and a wide tooth prevents the pinions from being rotated through zero when the racks are being differentially positioned in accordance with the data in the said storage device. Applicant directs attention to United States Patent No. 2,079,355, issued to Charles L. Lee, for more complete structural details of the storage device and to the Lehman patent for details of the engaging cams.

In the Laurence Lehman Patent No. 2,243,806, to which attention has been directed, full disclosure is made of the mechanism for locking the "balance" key for the I totalizer when said totalizer is overdrawn, and for unlocking the four cycle mechanism used in taking a total or sub-total of the overdrawn totalizer, to convert the complement of the true negative total standing on the said balance totalizer so that it may be printed as a true negative total. The said complement of the true negative total is cleared from the totalizer in total taking operations and reentered into the totalizer in sub-total taking operations. Whenever either the total overdraft or sub-total overdraft keys are depressed this overdraft mechanism causes the machine to make four complete oscillations of the main drive shaft 25 and also causes the assembly of cams on stub shaft 198 (Fig. 2) to make one complete rotation. The rotation of these cams controls the totalizer engaging mechanisms of the I totalizer, the V totalizer, the engaging mechanism of the storage device, and the cycling mechanism.

In taking a total of the overdrawn balance or I totalizer, the complement of the negative total is withdrawn therefrom in the first cycle by having the totalizer pinions in engagement with the racks before their rearward movement and having the totalizer rotated to zero. At the mid-cycle, the zeroized balance totalizer pinions are disengaged from the racks and the pinions of the storage device are engaged therewith, to have added therein the said complement of the negative total as the racks move forward to home position on the last half of the first cycle. In the second cycle, the then cleared balance totalizer is conditioned for a subtract operation and its pinions are carried into engagement with the racks before their rearward movement commences. The storage device pinions having stayed in engagement with the racks and being prevented from passing through zero, the complement of the true negative total will be subtracted from the zeroized balance totalizer, leaving thereon the true negative total, whereupon the balance totalizer pinions and storage device pinions are disengaged from the racks which thereafter move forward to home position during the last half of the second cycle. In the third cycle, the balance totalizer pinions are engaged with the racks before their initial rearward movement so that on the rearward movement the true negative total will be taken from the balance totalizer. The storage device pinions are then engaged with the racks and on forward movement of the racks to home position the true negative total is entered therein.

In the fourth cycle, the storage device, having been left in engagement with the racks, is cleared of the true negative total as the racks move rearwardly in the first half cycle and the printed impression thereof is made at mid-cycle, after which the zeroized storage device is disengaged and the racks are returned to home position, completing the operation.

In taking a sub-total of the overdrawn balance totalizer, the operation during the first three cycles is the same as in a total taking operation just described, except that in the last half of the third cycle, conditions are set up to engage the balance totalizer pinions with the racks during the first half of the fourth cycle in subtract timing, which event causes a subtraction of the true negative total to be made from the zeroized balance totalizer, which overdraws the said balance totalizer, leaving thereon the complement of the negative total, as it was at the beginning of the operation. All of this mechanism is old, having been fully described in the Laurence Lehman patent mentioned before, this summary being given as a background for explaining and comparing the operation of the item or V totalizer control mechanism therewith.

*Item totalizer control on taking a total of the overdraft and on taking a sub-total of the overdraft*

As it is one of the purposes of this invention to take the total or sub-total of the data contained on the item or V totalizer with the taking of a total or sub-total of the balance totalizer, whether the condition of the balance totalizer be positive or negative, and as there is always a positive amount on the item totalizer, it is necessary to provide special mechanism for controlling the engagement of the item or V totalizer on total and sub-total operations when the balance totalizer is overdrawn. This mechanism operates in conjunction with the overdraft total taking and sub-total taking mechanism of the balance totalizer as described herein in summary and in the Lehman patent in detail.

On the first cycle of the four cycle overdraft operation, the pinions of the item or V totalizer are engaged with the racks on their rearward movement, in total timing, just as are the pinions of the balance totalizer, the yoke 181 and pin 190 connection (Fig. 6) which normally causes the balance totalizer total control to operate the item or V totalizer total control being in normal position. The item totalizer is an adding totalizer having an adding pawl 92 (Fig. 1) only, whereas the balance totalizer is an add and subtract totalizer having an adding pawl 91 (Fig. 17) and a subtracting pawl 93.

The pinions on the item totalizer, therefore, cannot be reversely rotated through zero, whereas the pinions of the balance totalizer may be reversely rotated through zero, providing the adding pawls are rendered ineffective and the subtracting pawls rendered effective. The item or V totalizer being in a zeroized condition at the end of the first cycle of operation, the associated item racks, 34, 76, and 77 (Fig. 2) cannot move rearwardly on the second and third cycles of the overdraft operation, in which cycles the balance and item totalizers are again engaged with the racks on their rearward movement, because the adding pawls 92 (Fig. 1) will prevent pinions 35 from passing through zero. The item totalizer V is engaged, therefore, in the second and third cycles in total taking timing, but without effect on the pinions, as they are at zero. The balance totalizer in the second cycle is conditioned for subtraction by lever 249 (Fig. 3) in the manner described in the Lehman patent, rendering the adding pawls 91 (Fig. 17) ineffective and rendering the subtracting pawls 93 effective, thereby allowing the pinions 21 to pass through zero. In the third cycle, the balance totalizer is conditioned for total taking, which allows the amount racks associated therewith to move rearwardly until the pinions 21 reach their zero stops. During the third cycle, the item differential racks remain stationary as they do during the second cycle, for the same reason. The total taken from the item or V totalizer during the first cycle is added into and thus left in the storage device until the end of the third cycle because, as said, the racks associated with the item totalizer are unable to move during the second and third cycles, whereas the data on the balance totalizer is being converted during the second and third cycles so as to turn the complement of the negative total into a true negative total. In the fourth cycle on an overdraft total taking operation, collar 166 (Figs. 2, 5, and 6) carrying the item total control levers 161 and 162 (Fig. 4) is shifted toward the left side of the machine on shaft 160, leaving the said item totalizer total control levers still operable by yoke 181 (Figs. 2 and 6) secured to the balance totalizer control mechanism, but ineffective to control flying lever 126 (Fig. 4) as levers 161 and 162 have been moved to the left of the operative plane of said flying lever 126. In the said fourth cycle, the balance totalizer is engaged with the racks only in a sub-total taking operation, such engagement being in subtract timing to subtract the true negative total as stored in the storage device from the zeroized balance totalizer. The V or item totalizer likewise is not engaged with the racks in the fourth cycle of an overdraft total operation, but is engaged with the racks in add timing in an overdraft sub-total taking operation, thus transferring the total of items from the storage device to the V totalizer as it was at the beginning of the operation. The storage device is cleared as the racks move rearwardly in the fourth cycle and when the storage device pinions are stopped in zero position the associated racks are positioned in accordance with the data withdrawn and the printer segments 24 (Figs. 1 and 17) being accordingly set, the printing impression is then made. The timing of the printing is fully described in the Lehman patent, the impression being made at about the middle of the fourth cycle.

Secured to stub shaft 198 (Fig. 2) on which are secured the cams controlling the total taking operations of the overdrawn balance totalizer as described in the Lehman patent, is a plate cam 199 which makes one rotation with shaft 198 in a counter-clockwise direction, as indicated by the arrow, on each overdraft total taking or overdraft sub-total taking operation. A link 200 slidably mounted on shafts 198 and 25 by means of slots 201 and 202 is held in the forward position shown in Fig. 2 by a roller cam follower 203, mounted on the forward end of link 200, which normally bears against a high part of the periphery of plate cam 199, keeping the link 200 from moving rearwardly as urged by spring 204. Link 200 is held in the normal position shown, until cam 199 has rotated approximately 270 degrees, which occurs at the end of the third cycle, when a low portion of the cam comes opposite the cam follower 203, allowing link 200 to move rearwardly in response to the action of spring 204. The cam 199 is so shaped that link 200 is in the rearward position during the entire fourth cycle of an overdraft operation, the shaft 198 and cam 199 turning 90 degrees each cycle. The movement of link 200 is transmitted to link 214, on the left side of the machine, by means of shaft 215 having secured thereto arms 216 and 217 to which the links 200 and 214 are respectively pivoted. Shaft 215 is journaled in brackets 218 and 219 riveted to totalizer frames 220 and 221. The forward end of link 214 is pivoted to the right arm 238 of a yoke 239 having a left arm 240. Yoke 239 is loosely mounted by said arms 238 and 240 on shaft 158. Pivoted to arm 240 is a forwardly extending link 242 having its forward end pivoted to cam lever 243 (Figs. 2 and 6) said cam lever 243 being pivoted to a stud 244 (Fig. 6) mounted on auxiliary frame plate 245. Backward movement of cam lever 243 in response to the same movement of links 242, 214 and 200 (Figs. 1 and 6), by means of cam slot 246 formed in cam lever 243, cooperating with pin 247 extending from collar 166, shifts said collar to the left, which carries with it the item or V totalizer total control lever assembly 161, 162 and 164. When levers 161, 162, and 164 are shifted to the left, they are out of the plane of movement of flying lever 126 and therefore unable to control its movement. Therefore, on the fourth cycle of an overdraft, links 200, 214, and 242, moving rearwardly, move levers 161, 162, and 164 to the left, thus allowing control of the item or V totalizer engaging means in the fourth cycle by means to be described, independent of the balance totalizer total taking controls.

At the end of the third cycle of an overdraft total taking or overdraft sub-total taking, the data of the V totalizer and the data of the I totalizer are in the storage device in true form, so that the differential racks may be set thereby. If a total is to be taken, the storage device pinions in engagement with the racks at the commencement of the fourth cycle are rotated to zero as the racks move rearwardly. At this point the printing operation takes place, the printing segments then being differentially set according to the true negative data and the item data. The storage device pinions are then disengaged and the racks return to home position, leaving both totalizers and the storage device cleared.

If a sub-total taking of the overdraft is performed, the storage device is operated as in an overdraft total taking, and in addition the I totalizer is engaged with the racks during the first half of the fourth cycle in a subtract operation and the V totalizer is engaged with the racks during the last half of the fourth cycle in an adding operation. It is for this reason that collar 166 is shifted to the left, allowing independent control of the I and V totalizer total control levers. At the end of such sub-total taking of the overdraft, the item data is back in the V totalizer in true form, the negative data is in the I totalizer in complementary form, and the storage device is cleared.

The mechanism required to replace the positive item total from the storage device into the item or V totalizer on the last half of the fourth cycle of a sub-total taking of the overdraft is new. This mechanism is controlled by the cam 261 (Fig. 16) which controls the totalizer engagement for the balance totalizer in overdraft operations as set forth in the Lehman patent. On the left end of shaft 248 (Figs. 2, 3, 4, and 16) is secured a finger 249 adapted, when shaft 248 is rocked counter-clockwise as seen in Fig. 4, to strike a stud 250 (Fig. 4) on one arm of a bell crank lever 251 rotatably mounted on frame supported stud 252 (Figs. 4 and 6). The other arm 253 of bell crank lever 251 bears a stud 254 which is engaged by a bifurcation in lever 255 pivotally mounted on stud 256. A cam slot 257 in lever 255 engages a pin 258 extending from a lever 259 which is pivotally mounted on stud 244, so that as finger 249 rocks bell crank lever 251 clockwise, as seen in Fig. 4, lever 255 is rocked counter-clockwise, and lever 259 is rocked clockwise to the effective position shown by the broken lines. In the effective position of lever 259 a stud 260 borne thereby is positioned to contact surface 183 of flying lever 126 so as to engage the item or V totalizer at the end of the first half of a cycle. It has been arranged that this occur during the fourth cycle after the racks have been positioned by the storage device, thus causing the data withdrawn from said V totalizer in the first cycle and placed in the storage device, to be reentered in the item totalizer in the last half of the fourth cycle as the racks return to home position.

The movement of finger 249 in a sub-total taking of the overdraft, in addition to causing an adding operation of the item totalizer in the last half of the fourth cycle, causes a subtracting operation of the balance totalizer.

The cam 261 (Fig. 16), secured on shaft 198, which controls the movement of finger 249 makes one complete rotation in the four cycles of an ovedraft total or overdraft sub-total operation as does the cam 199 (Fig. 2) the movement of which has been explained. Secured to the light end of shaft 248 is a bell crank lever 276 to one arm of which is attached a spring 277 urging the shaft in a clockwise direction. To the other arm of bell crank lever 276 is pivoted a link 278 (see Fig. 16) having its rear end pivoted to the forwardly extending arm of a bell crank lever 274 rockably mounted on stud 275. A roller cam follower 273 mounted on the forward arm of bell crank lever 274 is held against the periphery of cam 261 by the action of spring 277. As cam 261 moves counter-clockwise a low point thereon coming to effective position will cause shaft 248 to rock clockwise and a high point on the cam therefore rocks shaft 248 counter-clockwise as seen in Fig. 16. A partial clockwise movement of shaft 248, as viewed in Fig. 16, causes finger 249 to condition the balance totalizer engaging controls for a total taking operation and a full clockwise movement thereof conditions the balance totalizer controls for a subtract operation and serves in addition to condition the item or V totalizer controls for an adding operation as just explained. Latch 281 is rocked counter-clockwise on stud 282 by depressing either the total overdraft or sub-total overdraft keys, releasing bell crank lever 274 to the action of cam 261 against which it is held by the tension of spring 277 acting through link 278. A counter-clockwise movement of bell crank lever 274 caused by the high points 279 and 280 on cam 261 striking cam follower 273 raises the rearwardly extending arm of bell crank lever 274 so as to be engageable by latch 281 at the end of either the third cycle or the end of the fourth cycle. On an overdraft total taking operation, latch 281 is effective at the end of the third cycle of operation and in an overdraft sub-total taking the latch 281 is not effective until the end of the fourth cycle of operation. Thus in an overdraft total operation the fourth quadrant 283 of the cam 261 has no effect on the shaft 248, whereas in an overdraft sub-total operation the low portion constituting the said fourth quadrant of the cam, conditions the engaging controls of the balance totalizer for a subtract operation, and conditions the V or the item totalizer for an adding operation. Details of the movement of shaft 248, of the cam 261, and of the conditioning of latch 281 are fully described in the Lehman patent.

*Special item counter*

A special item counter 300 (Figs. 2, 3, and 13) is provided to count operations involving the balance totalizer under control of the amount keys. Thus, in a bank customer's account such as that shown in Fig. 15, a unit will be added into the counter 300 for each addition into and for each subtraction from the account as these involve the balance totalizer. The counter 300 not being cleared on total operations, a record of the number of deposit and withdrawal transactions over a selected period of time may be kept. Projecting from the balance totalizer engaging link 301 (Figs. 3 and 13) is a stud 302 (Fig. 13) loosely embraced by a bifurcation in the end of lever 303 secured to a shaft 304 (Figs. 3 and 13) which shaft has secured to its left end a lever 305 having a bent over ear 306.

Each time the balance totalizer is engaged and disengaged the stud 302 through lever 303 rocks shaft 304 first counter-clockwise then clockwise as seen in Fig. 13, which causes lever 305 to rock in the same sense. A lever 307 pivoted on stud 331 has a hook 308 (Fig. 3) at its rear end adapted to engage ear 306 so that the complete rocking of lever 305 gives lever 307 one forward and backward motion, if levers 305 and 307 are coupled together, thus adding a unit into the counter by means of a pawl 309 (Fig. 13) and ratchet 310, said pawl being pivotally connected to the link and counter wheel shaft in the conventional manner.

Normally lever 307 is kept raised in the disengaged position shown in Figs. 3 and 13 by a link 311 whose upper end is pivoted to lever 307 and whose lower end is pivoted to a lever 312 secured to a shaft 313 which shaft is held in its most clockwise position as seen in Fig. 13, as determined by stud 314 and slot 315, by means of a lever 316 secured to shaft 313, said lever 316 being operated by a link 317 pivoted thereto. Link 317 has a bifurcated front end, which engages a stud 318 (Figs. 12 and 13) projecting from the upper arm of bell crank lever 319 which as before explained is secured to the left end of shaft 41. A spring 320 normally holds link 317 in resilient contact with stud 318 so that bell crank lever 319 may move relatively to link 317 as is required in total operations to be explained.

Whenever an amount key is depressed shaft 41 is rocked counter-clockwise, as previously explained, which rocks bell crank lever 319 in the same sense, resiliently drawing forward link 317 which rocks shaft 313 (Fig. 13) counter-clockwise causing hook 308 to be operatively engaged with lever 305 so that when the balance totalizer is engaged, a unit will be added into the counter 300. As bell crank lever 319 also rocks during a total or sub-total operation, by reason of the zero stop pawls being moved to unlatched position as explained in the Lehman patent to which reference has been made, which would normally engage hook 308 with lever 305 and which action must be prevented so total operations will not be counted, a lever 321 is secured to shaft 313 which lever, if kept from moving from its home position shown in Fig. 13, will prevent shaft 313 from moving and thus prevent hook 308 from engaging lever 305. On the outer end of lever 321 is a stud 322 adapted to be engaged by surface 329 of an arm 323 secured to a yoke 325 loosely mounted on shaft 160. The yoke 325 is normally held in the inoperative position shown in Fig. 13 by the weight of arm 323 holding a stud 326, projecting from arm 327 pinned to yoke 325, against surface 328 of a member 330. Surface 328 on the member 330 is adapted to force yoke 325 counter-clockwise blocking motion of lever 321 on total taking operation, as member 330 is forced downwardly upon depression of the total key, in a manner well known and described in the Ellis Patent No. 1,203,863, to which reference is made, the downward motion of said member 330 controlling the release of keys during total operations.

*Operation*

In the facsimile account record shown in Fig. 15 the checks for $25.00 and $10.00 were entered into the balance totalizer by separate machine operations, and a "unit" was automatically added into the item or V totalizer for each of these subtract operations. A carriage control element positioned for these columns conditions the item or V totalizer to add and conditions the balance totalizer to subtract. The deposit of $75.00 was entered in a column where the carriage control element conditioned the balance totalizer to add but did not condition the item totalizer to add. Therefore, when a sub-total of the positive amount then standing on the balance totalizer is printed in the first balance column, a "2" is printed simultaneously in the "item" column representing the two checks. The carriage is then tabulated to the second balance column and a total is taken, reproducing the data printed in the first item and balance columns and clearing the machine. This record sheet is then removed from the machine to be reinserted in future transactions. When the record is next used for a transaction the old balance, $40.00, is picked up and is added into the balance totalizer, without printing, the printing segments being prevented from moving in the well known manner described in United States Letters Patent No. 1,562,491, issued to F. W. Bernau, by means of a "non-print" bail effective in a column where it is desired to have the pickup of the old balance occur. The next transaction, a list of checks totaling $160.00, is then entered in the check column in a single entry and this being the total of a list of fifteen checks the keys representing "15" in the item key banks are depressed by the operator causing that amount to be entered into the V totalizer and later to be reproduced on the total and sub-total operations. The total and sub-total operations just mentioned are overdraft operations and the "15" printed in the sub-total column 63 required the use of the special mechanism which forms a part of this invention. The third and fourth lines of entries are single check transactions in which the automatic "1" is printed.

If it is desired, the number of checks constituting the previous transaction may be "picked up" along with the old balance on a subsequent transaction, thus having the last entry in the item column giving the total number of checks entered in all the transactions covering the period of accounting.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a machine of the class described having a plurality of individually mounted totalizers at least one of which is an adding and subtracting totalizer, the combination of a main operating means to cause the machine to make cycles of operation; a plurality of differential means operated by the main operating means and engageable with the totalizers for entering items into and withdrawing totals of items from the respective totalizers; separate totalizer engaging means for each of said totalizers; separate controls for said totalizer engaging means; a means normally connecting the totalizer engaging control means of the adding and subtracting totalizer and the totalizer engaging control means of an associated totalizer so they will operate their respective engaging means alike; and shifting means whereby the said control means for the associated totalizer is automatically rendered ineffective in certain cycles of operation.

2. In a machine of the class described, the combination of an adding and subtracting totalizer; an adding totalizer; a plurality of differentially settable means; a means to engage the adding and subtracting totalizer with one of the differentially settable means for the purpose of entering items therein or withdrawing totals of items therefrom; means to engage the adding totalizer with another one of the differentially settable means for the purpose of entering items therein or withdrawing totals of items therefrom; means controlling the engagement of the adding totalizer with its associated differentially settable means; means controlling the engagement of the adding and subtracting totalizer with its associated differentially settable means; and coupling means comprising a two-part member whereby the engaging controls of both totalizers are operated together, one part of said member being shiftable so as to be inoperative to control the engagement of the adding totalizer.

3. In a machine of the class described having a totalizer for registering positive data in true form and negative data in complementary form, and a second totalizer for registering positive data in true form, the combination of a plurality of differential means for data entering and data withdrawing; individual total and sub-total totalizer engaging controls for each totalizer whereby data may be entered into or withdrawn from either totalizer by their control upon the engaging operating means; means normally connecting the aforesaid totalizer engaging controls so that one is operated by the other and means for rendering ineffective the totalizer engaging controls for said second totalizer.

4. In a machine of the class described, the combination of a main operating means; an adding and subtracting totalizer consisting of a single pinion for each denominational order in which totalizer negative data is accumulated in complementary form; a separately mounted adding totalizer consisting of a single pinion for each denominational order said denominational orders being distinct and separate from those of the adding and subtracting totalizer; a separate differential means for each denominational order for entering data into and withdrawing data from the pinions of the totalizer with which such differential means is associated; a storage device consisting of a single pinion for each of the denominational orders into which data from the corresponding pinions on the totalizers may be stored either thereafter to be cleared from the machine or restored to the totalizers; a totalizer engaging means for each totalizer; storage device engaging means; a total key; means to control the totalizer engaging means of both totalizers which control means is rendered effective by the operation of the total key; a second total key to be operated when there is negative data in the adding and subtracting totalizer; a second control means operated by the said second total key to operate the first mentioned control means; and a cam operated with the second control means to control the effect of the second control means on the first mentioned control means.

5. In a machine of the class described, the combination of an item totalizer for accumulating positive data; an adding and subtracting totalizer for accumulating positive data and negative data said negative data being accumulated in complementary form; a plurality of differentially settable means for entering data into, reading data from, or withdrawing data from said totalizers; a differential means being provided for each denominational element of each totalizer; a separate means to engage each totalizer with the differential means for entry, reading, or withdrawal of data; means for jointly operating the two totalizer engaging means on data withdrawing operations; means for rendering ineffective the adding totalizer engaging operating means; and a second means for operating the totalizer engaging means for the adding totalizer on data reading operations when the first mentioned operating means is ineffective.

6. In a machine of the class described, the combination of an item totalizer for accumulating positive data; an adding and subtracting totalizer for accumulating positive data and negative data said negative data being accumulated in complementary form; a plurality of differentially settable means for entering data into, reading, or withdrawing data from said totalizers, a differential means being provided for each denominational element of each totalizer; a separate means to engage each totalizer with the differential means for entry, reading, or withdrawal of data; said reading or withdrawing operations involving a plural cycle operation when the data is negative to convert the complementary form into a true negative form; connecting operating means for jointly operating the two totalizer engaging means on data withdrawing operations; means for separately operating the totalizer engaging means of the adding totalizer; and means for rendering the first operating means for the adding totalizer engaging means ineffective during a certain cycle of a plural cycle operation in reading and withdrawing operations in which the data on the adding and subtracting totalizer is negative.

7. In a machine of the class described, the combination of an add and subtract totalizer of the class in which a negative balance is represented by a complement of the true negative balance; an add totalizer; a cycling mechanism to control the machine to make a plurality of operations when withdrawing a negative balance from the balance totalizer to convert the complement of the true negative balance into a true negative balance; and means controlled by the cycling mechanism to control the add totalizer to withdraw a positive total from the add totalizer during one of said plurality of operations so that a total is withdrawn from both of said totalizers during a single negative total withdrawing operation.

8. In a machine of the class described, the combination of an add and subtract totalizer of the class in which a negative balance is represented by a complement of the true negative balance; an add totalizer; a cycling mechanism to control the machine to make a plurality of operations when withdrawing a negative balance from the balance totalizer to convert the complement of the true negative balance into a true negative balance; a set of differential actuators associated with the balance totalizers; an engaging mechanism to engage the balance totalizer with the associated actuators during certain of said plurality of operations; a set of differential actuators associated with the add totalizer; an engaging mechanism to engage the add totalizer with its associated set of differential actuators; a main operating means to normally actuate both engaging means; and connections between the cycling mechanism and the add totalizer engaging means to control the effectivity thereof during certain of the operations of said plurality of operations to withdraw a positive total from the add totalizer during one of said plurality of operations so that said positive and said negative totals are withdrawn during the same plurality of operations.

9. In a machine of the class described, the combination of an add and subtract totalizer of the class in which a negative balance is represented by a complement of the true negative balance; an add totalizer; a cycling mechanism to control the machine to make a plurality of operations when withdrawing a negative balance from the balance totalizer to convert the complement of the true negative balance into a true negative balance; a set of differential actuators associated with the balance totalizers; an engaging mechanism to engage the balance totalizer with the associated actuators during certain of said plurality of operations; a set of differential actuators associated with the add totalizer; an engaging mechanism to engage the add totalizer with its associated set of differential actuators; a common means connected to both engaging means to normally actuate both engaging means simultaneously; a cam means to disconnect and connect the engaging means for the add totalizer from and to the common means; and connections operated by the cycling mechanism to actuate the cam means to disconnect and connect the engaging means from and to the common means during certain operations of said plurality of operations to control the withdrawal of a total from the add totalizer during the same plurality of operations in which a negative total is withdrawn from the add and subtract totalizer.

HENRY F. LANG.